(12) United States Patent
Eo et al.

(10) Patent No.: US 9,886,243 B2
(45) Date of Patent: *Feb. 6, 2018

(54) DECLARATIVE CONFIGURATION AND EXECUTION OF CARD CONTENT MANAGEMENT OPERATIONS FOR TRUSTED SERVICE MANAGER

(71) Applicant: INTERNATIONAL BUSINESS MACHINES CORPORATION, Armonk, NY (US)

(72) Inventors: Youngjin Eo, Seoul (KR); Jinho Lee, Seoul (KR); Jooho Lee, Seoul (KR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,311

(22) Filed: Apr. 28, 2015

(65) Prior Publication Data
US 2015/0242189 A1 Aug. 27, 2015

Related U.S. Application Data

(63) Continuation of application No. 13/893,993, filed on May 14, 2013, now Pat. No. 9,052,891.

(51) Int. Cl.
*G06F 9/44* (2006.01)
*G06F 9/445* (2006.01)

(52) U.S. Cl.
CPC .............. *G06F 8/31* (2013.01); *G06F 8/34* (2013.01); *G06F 8/311* (2013.01); *G06F 8/60* (2013.01)

(58) Field of Classification Search
CPC ..... G06F 8/38; G06F 8/31; G06F 8/34; G06F 8/60; G06F 8/311
See application file for complete search history.

(56) References Cited

U.S. PATENT DOCUMENTS 4,583,164 A * 4/1986 Tolle ................. G06F 8/311
709/252
4,734,848 A * 3/1988 Yamano ............. G06F 8/311
717/120

(Continued)

FOREIGN PATENT DOCUMENTS

CN 102087716 6/2011

OTHER PUBLICATIONS

Global Platform, "GlobalPlatform Card Composition Model", [Online], 2012, pp. 1-38, [Retrieved from Internet on Sep. 11, 2016], <http://www.globalplatform.org/specificationform.asp?fid=7769>.*

(Continued)

*Primary Examiner* — Ziaul A Chowdhury
(74) *Attorney, Agent, or Firm* — Tutunjian & Bitetto, P.C.; Vazken Alexanian

(57) ABSTRACT

A method for configuring and executing card content management (CCM) operations in a declarative manner includes composing a CCM operation declaration, wherein each CCM operation includes one or more CCM scripts and storing the CCM operation declaration in memory. When provisioning is needed, applicable scripts for the CCM operation declaration are fetched from the memory. An execution context needed for each script in the CCM operation declaration is prepared. The scripts are executed in an order specified in the CCM operation declaration.

15 Claims, 3 Drawing Sheets

(56) References Cited

U.S. PATENT DOCUMENTS

| | | | | |
|---|---|---|---|---|
| 5,187,788 | A * | 2/1993 | Marmelstein | G06F 8/34 717/109 |
| 5,530,863 | A * | 6/1996 | Hino | G06F 8/311 717/141 |
| 6,961,929 | B1 * | 11/2005 | Pelegri-Llopart | G06F 8/31 717/115 |
| 7,019,743 | B1 * | 3/2006 | Wainwright | G06F 3/0486 345/420 |
| 7,165,243 | B1 * | 1/2007 | Pelegri-Llopart | G06F 8/31 717/115 |
| 7,421,662 | B1 * | 9/2008 | Akiti | G06F 8/31 715/764 |
| 7,624,372 | B1 * | 11/2009 | Stewart | G06F 17/246 717/106 |
| 7,971,186 | B1 * | 6/2011 | Peyton | G06F 8/34 717/109 |
| 8,010,572 | B1 * | 8/2011 | Mazzagatti | G06F 17/30327 707/797 |
| 9,185,089 | B2 * | 11/2015 | Khan | H04L 63/062 |
| 9,361,070 | B1 * | 6/2016 | Nuss | G06F 8/31 |
| 2002/0040312 | A1 * | 4/2002 | Dhar | A61J 9/00 705/7.26 |
| 2002/0040936 | A1 * | 4/2002 | Wentker | G06F 8/60 235/492 |
| 2006/0015847 | A1 * | 1/2006 | Carroll, Jr. | G06F 8/38 717/109 |
| 2008/0034423 | A1 * | 2/2008 | Durix | G06F 21/51 726/20 |
| 2008/0046570 | A1 * | 2/2008 | Abel | H04L 12/66 709/227 |
| 2008/0303826 | A1 * | 12/2008 | Schiff | G06F 17/212 345/473 |
| 2008/0307385 | A1 * | 12/2008 | Dreiling | G06F 8/34 717/108 |
| 2009/0037897 | A1 * | 2/2009 | Dull, III | G06F 8/60 717/168 |
| 2009/0044129 | A1 * | 2/2009 | Ebrom | G06F 8/34 715/738 |
| 2010/0100868 | A1 * | 4/2010 | Shukla | G06F 8/34 717/109 |
| 2010/0178945 | A1 | 7/2010 | Millet et al. | |
| 2011/0078081 | A1 | 3/2011 | Pirzadeh et al. | |
| 2012/0047237 | A1 | 2/2012 | Arvidsson et al. | |
| 2012/0129452 | A1 | 5/2012 | Koh et al. | |
| 2012/0159195 | A1 | 6/2012 | Von Behren et al. | |
| 2012/0172089 | A1 | 7/2012 | Bae et al. | |
| 2012/0174060 | A1 * | 7/2012 | Rivkin | G06F 8/34 717/105 |
| 2013/0111207 | A1 * | 5/2013 | von Behren | G06Q 20/3552 713/164 |
| 2013/0124349 | A1 * | 5/2013 | Khan | G06Q 20/36 705/21 |
| 2014/0129430 | A1 * | 5/2014 | Desai | G06Q 20/08 705/39 |
| 2014/0134981 | A1 * | 5/2014 | Park | H04W 12/06 455/411 |
| 2014/0140509 | A1 * | 5/2014 | Chastain | G06F 21/6227 380/270 |
| 2014/0143534 | A1 * | 5/2014 | Chastain | H04L 63/0428 713/150 |
| 2014/0188713 | A1 * | 7/2014 | Alimi | G06Q 20/322 705/39 |
| 2014/0189880 | A1 * | 7/2014 | Funk | G06F 21/62 726/27 |
| 2014/0215029 | A1 * | 7/2014 | Terwilliger | G06F 8/60 709/220 |

OTHER PUBLICATIONS

Vincent Alimi et al., "Post-distribution provisioning and personalization of a payment application on a UICC-based Secure Element", [Online], 2009, pp. 701-705, [Retrieved from Internet on Sep. 11, 2016], <http://ieeexplore.ieee.org/stamp/stamp.jsp?arnumber=5066550>.*

Alimi, V. "An Ontology-Based Framework to Model a Globalplatform Secure Element" 2012 International 4th Workshop on Near Field Communication. Mar. 2012. pp. 25-30.

* cited by examiner

DECLARATIVE CONFIGURATION AND EXECUTION OF CARD CONTENT MANAGEMENT OPERATIONS FOR TRUSTED SERVICE MANAGER

RELATED APPLICATION DATA

This application is a Continuation application of co-pending U.S. patent application Ser. No. 13/893,993 filed May 14, 2013, incorporated herein by reference in its entirety.

BACKGROUND

Technical Field

The present invention relates to card content management, and more particularly to a system and method for configuration and execution of card content management operations using declarative programming.

Description of the Related Art

Convergence of smart card technology and mobile devices led to the advent of mobile payment. High growth potential of the mobile payment market is drawing strong interest from various market participants. Card content management (CCM) refers to the process of provisioning applications and data to secure elements (SE) residing in mobile devices. A trusted service manager (TSM) is the system entity that performs CCM. From a technical standpoint CCM is essentially the delivery of Application Data Units (APDUs) to a secure element (SE), which are byte-sequence instructions that the SE understands. GlobalPlatform's Systems Scripting Language Specification v1.1.0 is an attempt to provide a common and flexible scripting language for programmatically carrying out CCM. A CCM script therefore is essentially a piece of programmed logic that delivers a particular set of APDUs to the SE.

Consider the following scenario for the initial issuance of a mobile payment card, i.e., provisioning a functional mobile payment card to a brand new end-user. From the end-user's perspective it is a single operation. However, within the TSM, this operation can be broken down into four separate tasks. These include: 1. Set Card Image Number (CIN); 2. Load application images; 3. Install applications; 4. Personalize applications.

One can write a single CCM script that does all four of the above tasks. However, this is not advantageous from a reusability perspective since for each new operation envisaged, new CCM script has to be programmed. For example, if re-installation of the applications is needed, the task which corresponds to 3. above, the "do-it-all" script is rendered useless.

Assume that as per the best practice guided by GlobalPlatform each of the above tasks is programmed in a separate script. The problem for the TSM is to fetch these scripts and execute them in the correct order. It is possible to program ad-hoc logic within the TSM for this particular CCM operation called 'initial-issuance', but this is not a generic solution. If there was another type of issuance operation called 'pre-loaded issuance' where application images are pre-loaded, i.e., consisting of only of tasks, 1., 3. and 4., new logic must be written to fetch and execute these scripts. An ad-hoc approach is not very scalable since new handler logic to retrieve and execute relevant scripts has to be written for each CCM operation. Moreover ad-hoc code is difficult to manage, has low legibility and is not effective in providing a lucid view of what a given operation consists of.

SUMMARY

A method for configuring and executing card content management (CCM) operations in a declarative manner includes composing a CCM operation declaration, wherein each CCM operation includes one or more CCM scripts and storing the CCM operation declaration in memory. When provisioning is needed, applicable scripts for the CCM operation declaration are fetched from the memory. An execution context needed for each script in the CCM operation declaration is prepared. The scripts are executed in an order specified in the CCM operation declaration.

A system for configuring and executing card content management (CCM) operations in a declarative manner includes a CCM operation declaration authoring tool configured to permit graphical composition of a CCM operation declaration, wherein each CCM operation includes one or more CCM scripts. A memory storage device for storing the CCM operation declaration is provided. A CCM setup module is configured for reading the CCM operation declaration, fetching applicable scripts for the CCM operation declaration, and preparing an execution context needed for each script in the CCM operation declaration. A CCM runner module is configured to execute the scripts in an order specified in the CCM operation declaration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
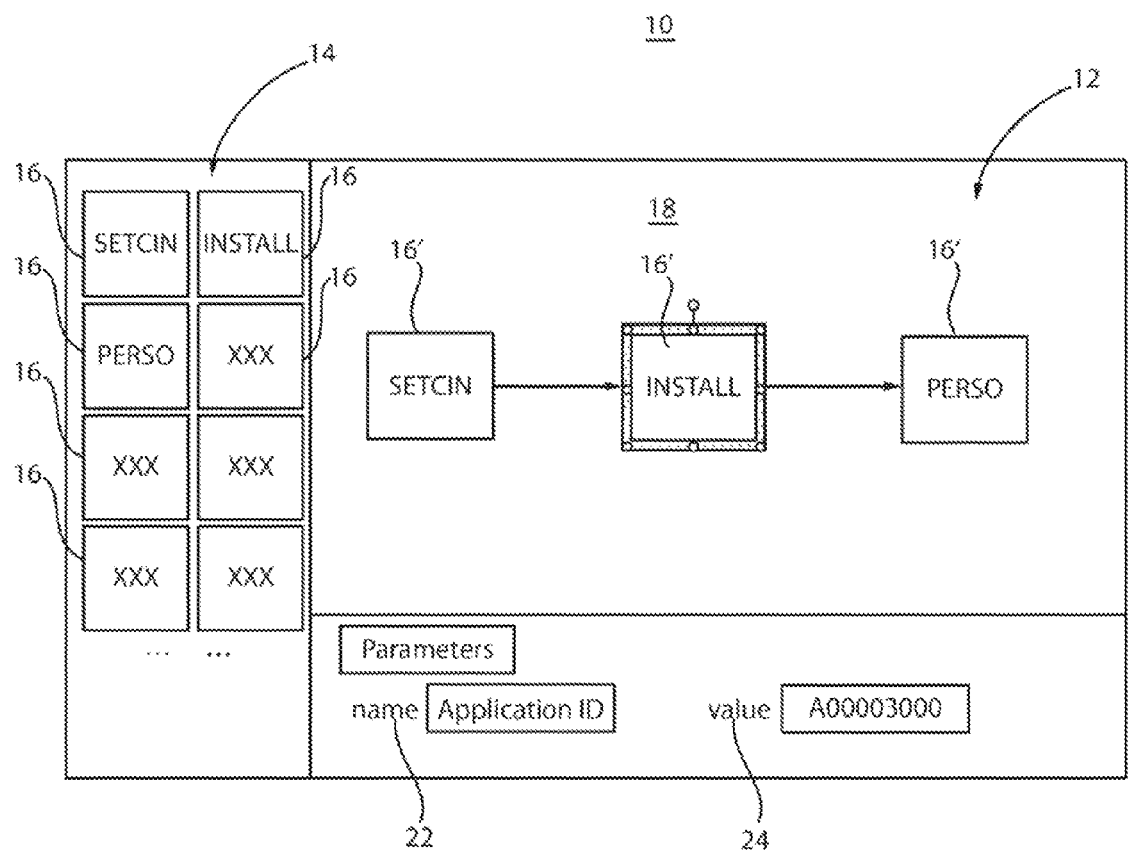
FIG. 1 is a diagram illustratively showing a graphical user interface for authoring card content management (CCM) operations in accordance with the present principles.

The present principles provide systems and methods for configuring and executing card content management (CCM) operations in a declarative manner for use within a Trusted Service Manager (TSM). Compared to traditional plastic smart cards issued by a single service provider (SP), e.g., a bank, today's multi-SP mobile payment secure elements (SE) call for more elaborate post-issuance capabilities. For this, an ability to easily configure and execute arbitrary CCM operations is needed. A CCM operation can be defined to be a series of atomic CCM scripts executed in sequence which represents a meaningful provisioning activity to the end-user. A declarative method for assembling flows of CCM scripts is provided to configure CCM operations and a graphical user interface (GUI) based authoring of such configuration. A software system is also provided that can execute the configured operations. This promotes reuse of script logic and eliminates the need for programming ad-hoc logic to satisfy requirements for new CCM operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In accordance with one embodiment, a declarative configuration of arbitrary card content management (CCM) operations is provided. In particularly useful embodiments, extensible markup language (XML) or JavaScript Object Notation (JSON) may be employed to configure arbitrary CCM operations in a declarative manner. Compulsory attributes that need to be captured in such configurations are as described below. Additional attributes can be added for more features. The attributes include:

Name of CCM operation—Any name representing a meaningful provisioning activity to end-users. End-users make requests for these operations. CCM script name—Under a CCM operation there are one or more CCM scripts. Each script shall have a name that reflects its task. This attribute is used to retrieve the script from persistent storage. Script Order—A number attribute that specifies a given script's position within an operation. Script Parameters—Scripts need certain parameter values to execute, e.g., application id for a load script. These parameter values need to be defined for each script so that they can be set as part of the script execution context preparation.

A possible example (Example 1) of a CCM operations configuration file is shown in a declarative manner in XML format. Example 1 is provided for illustrative purposes only.

EXAMPLE 1

```
<?xml version="1.0" encoding="UTF-8"?>
<Operation name="initial-issuance">
    <script name="SETCIN" order="1">
        <parameter name="CIN" value="card.cin"/>
    </script>
    <script name="LOAD" order="2">
        <parameter name="AID" value="application.aid"/>
    </script>
    <script name="INSTALL" order="3">
        <parameter name="AID" value="application.aid"/>
    </script>
    <script name="PERSONALIZATION" order="4"/>
</Operation>
<Operation name="preloaded-issuance">
    <script name="SETCIN" order="1">
        <parameter name="CIN" value="card.cin"/>
    </script>
    <script name="INSTALL" order="2">
        <parameter name="AID" value="application.aid"/>
    </script>
    <script name="PERSONALIZATION" order="3"/>
</Operation>
```

Referring now to the drawings in which like numerals represent the same or similar elements and initially to FIG. 1, a drag and drop GUI-based authoring scenario is illustratively depicted. For ease of authoring, a GUI-based tooling application for a TSM 10 is employed for composing configuration files described above. A GUI 12 for CCM operation configuration includes the following characteristics. A screen 14 includes available CCM scripts within the TSM as draggable icons 16. CCM scripts as icons 16' can be dragged and dropped in a main canvas 18. CCM scripts as icons 16 can be connected into a sequence using flowchart constructs 20. For each script in focus (e.g., "INSTALL" as set forth in Example 1), parameter names 22 and values 24 can be entered.

Figure 2:
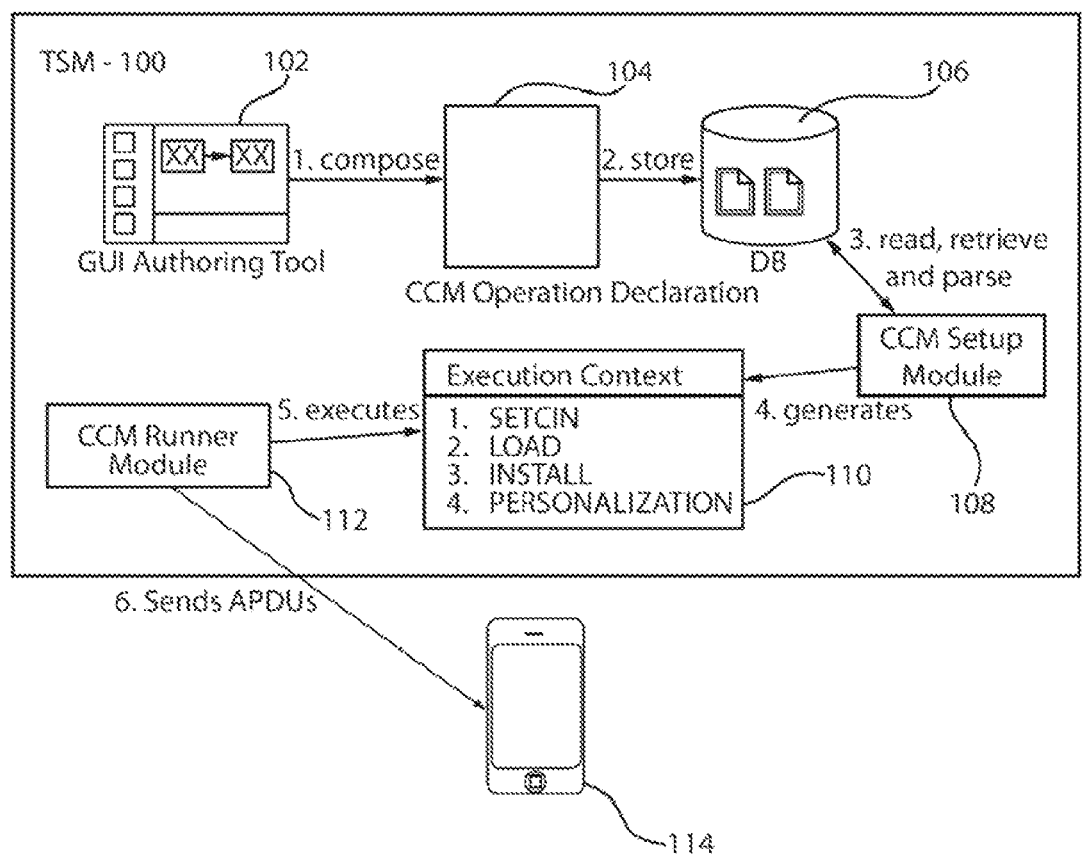
FIG. 2 is a block/flow diagram showing an integrated system for configuring and executing CCM operations in a declarative manner in accordance with one illustrative embodiment.

Referring to FIG. 2, an integrated system/integrated method flow is shown within a TSM 100 in accordance with the present principles. FIG. 2 shows a flow of events that take place when a CCM operation needs to be executed. A CCM script is essentially a piece of programmed logic that delivers a particular set of Application Data Units (APDUs) to a secure element (SE) of a mobile device. APDUs are byte-sequence instructions that the SE understands. A desired operation is configured declaratively using a GUI tool 102 to provide a CCM operation configuration 104. GUI tool 102 includes the features and functions as described with respect to FIG. 1. The configuration 104 is stored in a database or other persistent storage 106. A CCM setup module 108 reads in the configuration for a given operation, retrieves the needed scripts and parses them. The CCM setup module 108 generates in-memory execution context 110 by setting parameters for the scripts and storing them in a structure suited for ordered execution. A CCM runner module 112 executes the scripts in the execution context. The CCM runner module 112 sends APDUs to a mobile device 114 as specified in the scripts. The mobile device 114 may include a cellular telephone, a computer device, a specifically designed transaction device, a cash register, a computer pad, a netbook, etc.

Once CCM operations are defined, they need a way to be executed. The CCM setup module 108 is a software module that reads the configuration and prepares the execution context for an operation. This module 108 can read in the CCM operations configuration 104. Upon request for a given CCM operation, the module 108 will retrieve the relevant scripts from the database 106 and parse them. The module 108 can create the execution context for the operation. That is, all the needed parameter values are set and the parsed scripts are stored in an iterator/list type data structure (execution context 110) in their desired order of execution.

Once the execution context 110 for a CCM operation is set up, it needs to be executed. The CCM runner module 112 is a software module that executes the parsed, parameter-filled scripts of the execution context 110 in order. The CCM runner module 112 maintains a cursor on the execution context to mark the current script. The CCM runner module 112 is responsible for interfacing with the mobile device 114. The CCM runner module 112 sends down APDUs to the mobile device 114 according to the current running script. When CCM runner module 112 gets to the end of the current running script, it moves the cursor to the next script and executes it. This process continues until all scripts in the execution context 110 are run. APDUs are sent to the mobile device 114 over a network, such as the Internet, a mobile network, a WiFi network, etc.

During use, the system 100 is accessed by the mobile device 114 to access content or applications in processing or using a smart card or the like. A smart card, chip card, or integrated circuit card (ICC) is any pocket-sized card with embedded integrated circuits. Smart cards may be made of plastic and can provide identification, authentication, data storage and application processing. Smart cards may provide strong security authentication for single sign-on (SSO) within organizations. The system 100 is employed to configure and execute arbitrary card content management (CCM) operations in a declarative manner for use within the TSM.

Declarative programming is a programming paradigm that expresses the logic of a computation without describing its control flow. Many languages applying this style attempt to minimize or eliminate side effects by describing what the program should accomplish, rather than describing how to go about accomplishing it.

Traditionally CCM operations were defined programmatically. Thus, for a given CCM operation, e.g., install_card_product, there would be a monolithic piece of programmed logic that performs the entire operation. This is inconvenient and inflexible from a re-use perspective. Also, with the traditional approach, even if some of the logic was modularized into functions, the order in which the functions are called still resided in program code which made it difficult to maintain. Put another way, new code needed to be written for every new CCM operation that needed to be supported.

The present methods are declarative as opposed to programmatic and comprise at least some of the following features. Small, fine-grained programmatic building blocks can be assembled in any order to configure arbitrary, complex CCM operations. An operation order is declared for execution. The present solution offers an intuitive and more flexible method that does not require programming/scripting knowledge. A GUI-based creation/editing of CCM operations ensures that the process flow of a given CCM operation will be available in diagrammatic form which enables, even non-programmers to configure/maintain CCM operations.

The declarative method promotes legibility, reusability, modularity and, ultimately, ease of development. With the programmatic method, the order in which atomic script fragments are executed is specified in some code. Thus, for someone to understand what a particular CCM operation consists of, he or she needs to be skilled in the programming language, e.g., Java, C++, etc. Even for a skilled programmer, it can be a time-consuming task figuring out what a CCM operation does. With the programmatic method, for each new CCM operation desired, new programming logic must be implemented, and there could be numerous issues in the event of platform migration.

The declarative method is advantageous in this regard because it is language-neutral, and new CCM operations can be configured intuitively using a GUI without coding. The present declarative framework unloads a lot of the burden off the CCM operation administrator.

Figure 3:
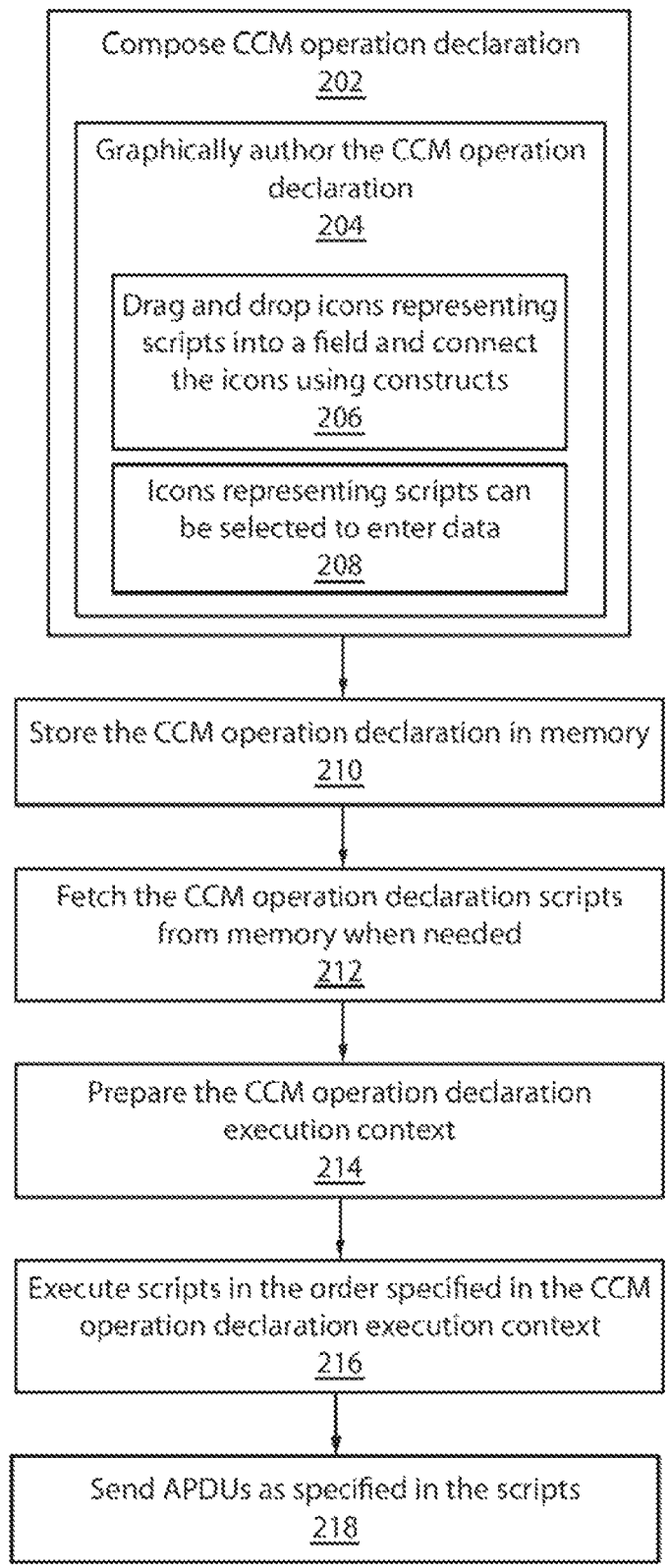
FIG. 3 is a block/flow diagram for configuring and executing card content management (CCM) operations in a declarative manner in accordance with one illustrative embodiment.

Referring to FIG. 3, a method for configuring and executing card content management (CCM) operations in a declarative manner is shown in accordance with one embodiment. In block 202, a CCM operation declaration is composed, wherein each CCM operation includes one or more CCM scripts. The CCM operation declaration (or configuration) includes CCM operations with at least the following attributes: name of CCM operation, script name, script order and script parameters. The CCM operation declaration may be written in one of extensible markup language (XML) and Javascript object notation (JSON), although other languages are contemplated.

In block 204, the CCM operation declaration is graphically authored using an authoring tool. In block 206, graphically authoring includes dragging and dropping icons representing scripts into a field (e.g., a main canvas) and connecting the icons into a sequence using constructs (e.g., connecting links). In block 208, graphically authoring includes representing scripts as icons and entering data associated with the script when an icon is selected.

In block 210, the CCM operation declaration is stored in memory, e.g., in a database. In block 212, when provisioning is needed, applicable scripts are fetched for the CCM operation declaration from the memory. In block 214, an execution context needed for each script in the CCM operation declaration is prepared. In block 216, the scripts are executed in an order specified in the execution context for the CCM operation declaration. In block 218, Application Data Units (APDUs) are sent to a mobile device as specified in the scripts. Interaction between the mobile device or devices and the trusted server manager may continue to provide or handle a plurality of transactions, which may include but are not limited to an initial issuance of a mobile payment card, transactions with the card, provisioning the card, etc.

While card content management is the application domain described throughout the disclosure. It should be understood that other domains may employ the present principles as well. For example, other applications where fragments of scripting logic need to be executed in some predefined order to complete a logical operation may employ the present principles.

Having described preferred embodiments for declarative configuration and execution of card content management operations for trusted service manager (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for configuring and executing card content management (CCM) operations in a declarative manner, comprising:
  composing a CCM operation declaration, wherein each CCM operation includes one or more CCM scripts, the composing the CCM operation declaration including graphically authoring the CCM operation declaration, wherein the graphically authoring includes dragging and dropping icons representing scripts into a field and connecting the icons into a sequence using constructs;
  storing the CCM operation declaration in memory;
  when provisioning is needed, fetching applicable scripts for the CCM operation declaration from the memory and creating parsed scripts by parsing the applicable scripts;
  preparing an execution context needed for each script in the CCM operation declaration, wherein all needed parameter values are set and the parsed scripts are stored in an iterator in a desired order of execution; and
  executing the scripts in an order specified in the CCM operation declaration.

2. The method as recited in claim 1, further comprising sending Application Data Units (APDUs) to a mobile device as specified in the scripts.

3. The method as recited in claim 1, wherein graphically authoring includes representing scripts as icons and entering data associated with the script when an icon is selected.

4. The method as recited in claim 1, wherein the CCM operation declaration includes CCM operations with at least the following attributes: name of CCM operation, script name, script order and script parameters.

5. The method as recited in claim 1, wherein the CCM operation declaration is written in one of extensible markup language (XML) and Javascript object notation (JSON).

6. A non-transitory computer readable storage medium comprising a computer readable program for configuring and executing card content management (CCM) operations in a declarative manner, wherein the computer readable program when executed on a computer causes the computer to perform steps comprising:
    composing a CCM operation declaration, wherein each CCM operation includes one or more CCM scripts, the composing the CCM operation declaration including graphically authoring the CCM operation declaration, wherein the graphically authoring includes dragging and dropping icons representing scripts into a field and connecting the icons into a sequence using constructs;
    storing the CCM operation declaration in memory;
    when provisioning is needed, fetching applicable scripts for the CCM operation declaration and creating parsed scripts by parsing the applicable scripts;
    preparing an execution context needed for each script in the CCM operation declaration, wherein all needed parameter values are set and the parsed scripts are stored in an iterator in a desired order of execution; and
    executing the scripts in an order specified in the CCM operation declaration.

7. The computer readable storage medium as recited in claim 6, further comprising sending Application Data Units (APDUs) to a mobile device as specified in the scripts.

8. The computer readable storage medium as recited in claim 6, wherein graphically authoring includes representing scripts as icons and entering data associated with the script when an icon is selected.

9. The computer readable storage medium as recited in claim 6, wherein the CCM operation declaration includes CCM operation with at least the following attributes: name of CCM operation, script name, script order and script parameters.

10. The computer readable storage medium as recited in claim 6, wherein the CCM operation declaration is written in one of extensible markup language (XML) and Javascript object notation (JSON).

11. A system for configuring and executing card content management (CCM) operations in a declarative manner, comprising:
    a CCM operation declaration authoring tool configured to compose a CCM operation declaration, wherein each CCM operation includes one or more CCM scripts, the CCM operation declaration authoring tool being further configured to compose the CCM operation declaration by graphically authoring the CCM operation declaration, wherein the graphically authoring includes dragging and dropping icons representing scripts into a field and connecting the icons into a sequence using constructs;
    a memory storage device for storing the CCM operation declaration;
    a CCM setup module configured for reading the CCM operation declaration, fetching applicable scripts for the CCM operation declaration, creating parsed scripts by parsing the applicable scripts, and preparing an execution context needed for each script in the CCM operation declaration, wherein all needed parameter values are set and the parsed scripts are stored in an iterator in a desired order of execution; and
    a CCM runner module configured to execute the scripts in an order specified in the CCM operation declaration.

12. The system as recited in claim 11, wherein the CCM runner module is further configured to send Application Data Units (APDUs) to a mobile device as specified in the scripts.

13. The system as recited in claim 11, wherein the authoring tool includes scripts represented as icons and permits data associated with the script to be entered when an icon is selected.

14. The system as recited in claim 11, wherein the CCM operation declaration includes CCM operations with at least the following attributes: name of CCM operation, script name, script order and script parameters.

15. The system as recited in claim 11, wherein the CCM operation declaration is written in one of extensible markup language (XML) and Javascript object notation (JSON).

* * * * *